(12) United States Patent
Alessandro et al.

(10) Patent No.: US 7,868,596 B2
(45) Date of Patent: Jan. 11, 2011

(54) METHOD OF CONTROLLING A STEP-UP DC-DC CONVERTER AND RELATED CONVERTER

(75) Inventors: Agatino Antonino Alessandro, S. Teresa di Riva (IT); Calogero Ribellino, Mascalucia (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 210 days.

(21) Appl. No.: 12/167,772

(22) Filed: Jul. 3, 2008

(65) Prior Publication Data

US 2009/0015230 A1    Jan. 15, 2009

(30) Foreign Application Priority Data

Jul. 4, 2007    (IT) .......................... VA2007A0060

(51) Int. Cl.
  *G05F 1/10*    (2006.01)
  *G05F 1/652*   (2006.01)
(52) U.S. Cl. .................. 323/222; 323/271; 323/225; 323/226; 323/270; 323/282
(58) Field of Classification Search .................. 323/222, 323/271, 225, 226, 270, 282, 284
  See application file for complete search history.

(56) References Cited

U.S. PATENT DOCUMENTS

| | | | | |
|---|---|---|---|---|
| 5,481,178 A * | 1/1996 | Wilcox et al. | ............... | 323/287 |
| 6,724,174 B1 * | 4/2004 | Esteves et al. | ............. | 323/224 |
| 6,815,939 B2 * | 11/2004 | Umemoto et al. | ........... | 323/286 |
| 7,006,362 B2 * | 2/2006 | Mizoguchi et al. | ............ | 363/16 |
| 7,180,274 B2 * | 2/2007 | Chen et al. | .................. | 323/222 |
| 7,372,238 B1 * | 5/2008 | Tomiyoshi | ................... | 323/224 |
| 7,372,241 B1 * | 5/2008 | Tomiyoshi | ................... | 323/288 |
| 2006/0125454 A1 | 6/2006 | Chen et al. | .................. | 323/282 |
| 2006/0158168 A1 | 7/2006 | Yoshida et al. | .............. | 323/282 |

OTHER PUBLICATIONS

EP Application No. 08104601.3, Extended European Search Report, mailed Apr. 23, 2010, 8 pgs.

* cited by examiner

*Primary Examiner*—Bao Q Vu
(74) *Attorney, Agent, or Firm*—Lisa K. Jorgenson; Allen, Dyer, Doppelt, Milbrath & Gilchrist, P.A.

(57) ABSTRACT

A method of controlling a DC-DC step-up converter including at least one power switch and an energy storage inductor may include comparing a converter output voltage to a first threshold and generating a first comparison flag based on the converter output voltage comparison. The method may also include comparing a voltage across the energy storage inductor to a second threshold and generating a second comparison flag based on the second energy storage inductor voltage comparison. The method may further include controlling the at least one power switch as a function of a logic state of the first comparison flag and the second comparison flag, and stepwise adjusting the second threshold as a function of the first comparison flag and the second comparison flag to limit a ripple on the converter output voltage.

14 Claims, 8 Drawing Sheets

METHOD OF CONTROLLING A STEP-UP DC-DC CONVERTER AND RELATED CONVERTER

FIELD OF THE INVENTION

This invention relates to voltage converters and, more particularly, to a method of controlling a step-up DC-DC converter and a related converter.

BACKGROUND OF THE INVENTION

Figure 1:
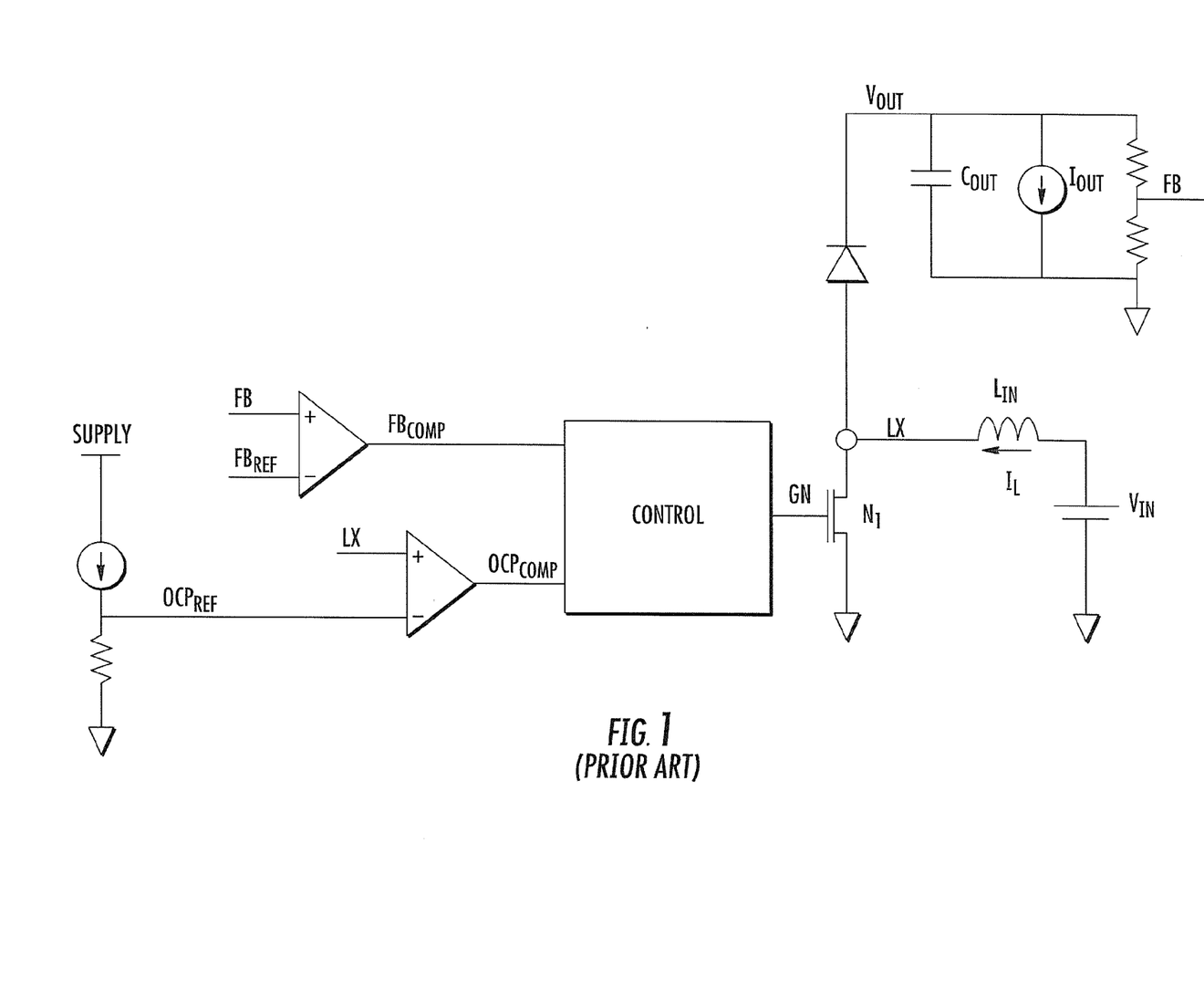
FIG. 1 illustrates a schematic block diagram of a hysteretic controller with fixed duty-cycle as in the prior art.

The amplitude of the ripple of the output voltage of a DC-DC converter depends on the characteristics of the load supplied by the converter and on the maximum current that may flow through the step-up inductor. FIG. 1 illustrates a typical functioning scheme of a hysteretic step-up converter. With this type of control, the switch $N_1$ is turned on and off with a certain fixed duty-cycle $\delta$ as long as $FB<FB_{REF}$, $$\delta = \frac{T_{ON}}{T_{ON} + T_{OFF}}$$

$T_{ON}$ being the duration of the charge phase, and $T_{OFF}$ being the duration of the discharge phase of the inductor. Usually, the maximum duration of the charge phase $T_{ON}$, and the minimum duration of the discharge phase $T_{OFF}$ are pre-established.

A feedback voltage FB, representative of the output voltage (in the depicted case it is generated by a voltage divider), is compared with a reference value $FB_{REF}$. When the feedback voltage increases and the condition $FB=FB_{REF}$ is met, the switch $N_1$ is turned off, and energy stored up to that moment in the inductor is discharged into the load. After the inductor has discharged, the system remains in a stand-by state until $FB<FB_{REF}$.

The control block CONTROL turns the switch $N_1$ as a function of a first comparison flag $FB_{COMP}$ and of a second comparison flag $OCP_{COMP}$ generated by comparing the voltage LX on the inductor (that is proportional to the current that flows therethrough) with a second reference voltage $OCP_{REF}$.

Figure 2:
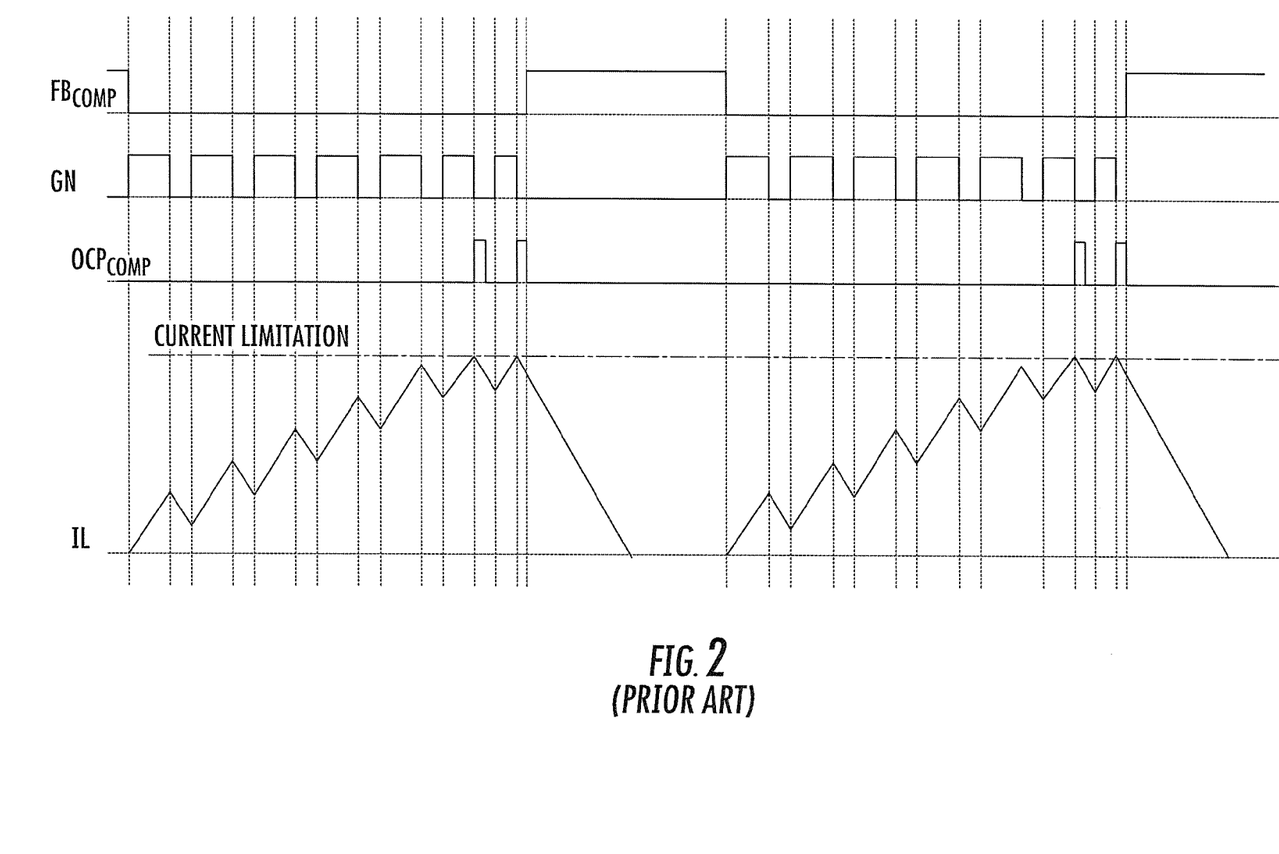
FIG. 2 illustrates waveforms of the main signal of the controller of FIG. 1.

The current through the inductor is constantly monitored such that during the phase it increases ($T_{ON}$), the current does not overcome a pre-established threshold (proportional to the voltage $OCP_{REF}$), such as to limit the input current and preventing the inductor from saturating. Should this happen, the conduction phase of the switch $N_1$ is immediately stopped and the inductor discharges completely. Typical waveforms of the inductor current are illustrated in FIG. 2, for example.

Usually, the duty-cycle $\delta$ is a design parameter tied only to $V_{IN}$ and $V_{OUT}$ (and not to the load current) according to the formula:

$$\delta = 1 - \frac{V_{IN}}{V_{OUT}} \text{ or } V_{OUT} = \frac{V_{IN}}{1-\delta}$$

The value of $\delta$ as well as the maximum current that may flow through the inductor influence the amplitude of the ripple and the efficiency of the converter. The advantage of this type of hysteretic control is its simplicity, since it does not typically require error amplifiers, nor accurate compensations.

Figure 3:
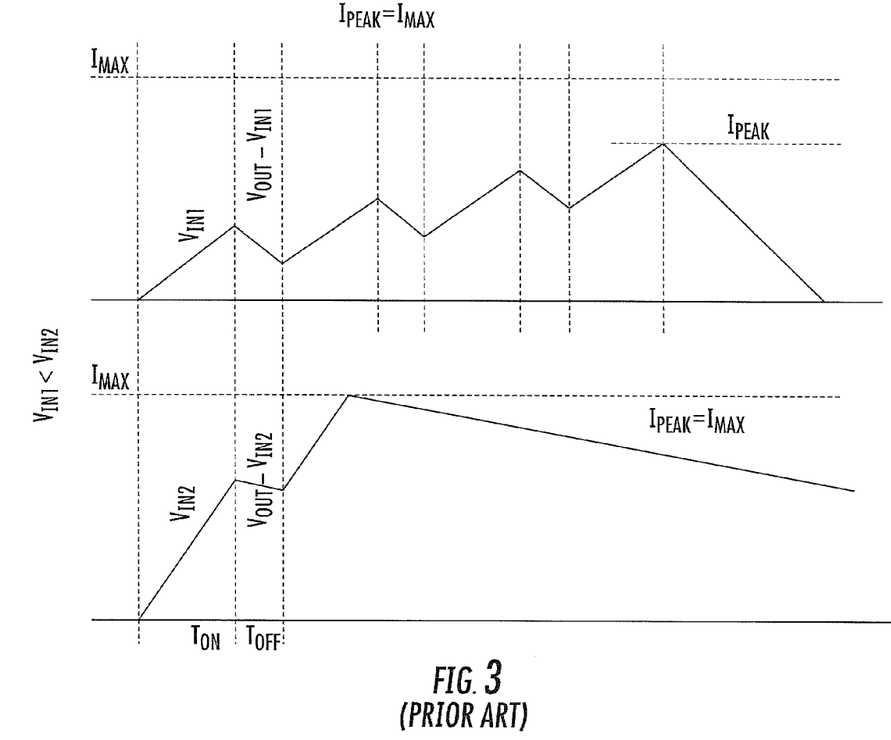
FIG. 3 illustrates waveforms of the current through the inductor of the controller of FIG. 1 for two different output voltages.

As shown in FIG. 3, if the supply voltage $V_{IN}$ is significantly smaller than the output voltage $V_{OUT}$, the inductor current increases slowly during the charge phase $T_{ON}$ and discharges fast during the discharge phase $T_{OFF}$ (this time is also fixed). If, by contrast, the supply voltage $V_{IN}$ is almost equal to the voltage $V_{OUT}$, the current increases fast during the $T_{ON}$ phase and discharges slowly during the $T_{OFF}$ phase. This causes an abrupt increase of the peak current through the inductor upon reaching the maximum current $I_{MAX}$ that may flow through the inductor. With the same output voltage $V_{OUT}$, the slope of the current through the inductor is proportional to the supply voltage $V_{IN}$ during the charge phase $T_{ON}$, and to $V_{OUT}-V_{IN}$ during the discharge phase $T_{OFF}$.

The performance of the converter depends on the external load and on the supply. In particular, there may be functioning conditions in which the output voltage ripple and the dissipated power become relatively large.

SUMMARY OF THE INVENTION

Investigations carried out by the applicant lead to infer that both problems are due to, or worsened by, the occurrence of large current peaks flowing through the inductor. The fact that the inductor is always charged as much as possible independently of the load being supplied could explain, at least partially, the observed decrement of performance.

Energy stored in the inductor is proportional to the current, thus, as soon as $FB \geq FB_{REF}$, the inductor discharges completely on the output tank capacitance causing a relatively large voltage ripple. Also, the increase of the peak current through the inductor causes a larger mean square value of the input current, thus causing an abrupt increase of power losses in the power switch, with a consequent reduction of conversion efficiency.

According to an embodiment, to overcome these shortcomings, the value of the maximum current through the inductor is increased stepwise to attain a maximum pre-established value. A relatively low current threshold is thus set in the presence of a load that absorbs a relatively small current and a higher current threshold when the load absorbs a relatively large current.

According to an embodiment implemented in a related converter, the output voltage of the converter and the inductor voltage are compared with respective thresholds. Thus, depending on the result of these distinct comparisons, the ripple of the output voltage of the converter is limited by adjusting the comparison threshold of the inductor voltage.

According to an embodiment, the number of occurrences of the output voltage of the converter reaching its respective threshold is down counted and the number of occurrences of the inductor voltage reaching its respective threshold is up-counted. When the resulting count attains a certain value, the comparison threshold of the inductor voltage is incremented, and the counting is reset.

DETAILED DESCRIPTION OF THE PREFERRED EMBODIMENTS

For sake of clarity, hereinafter reference will be made to a hysteretic step-up converter controlled in pulse frequency modulation (PFM) mode, though the same considerations hold for a different pulse width modulation-like (PWN) type of control.

Figure 4:
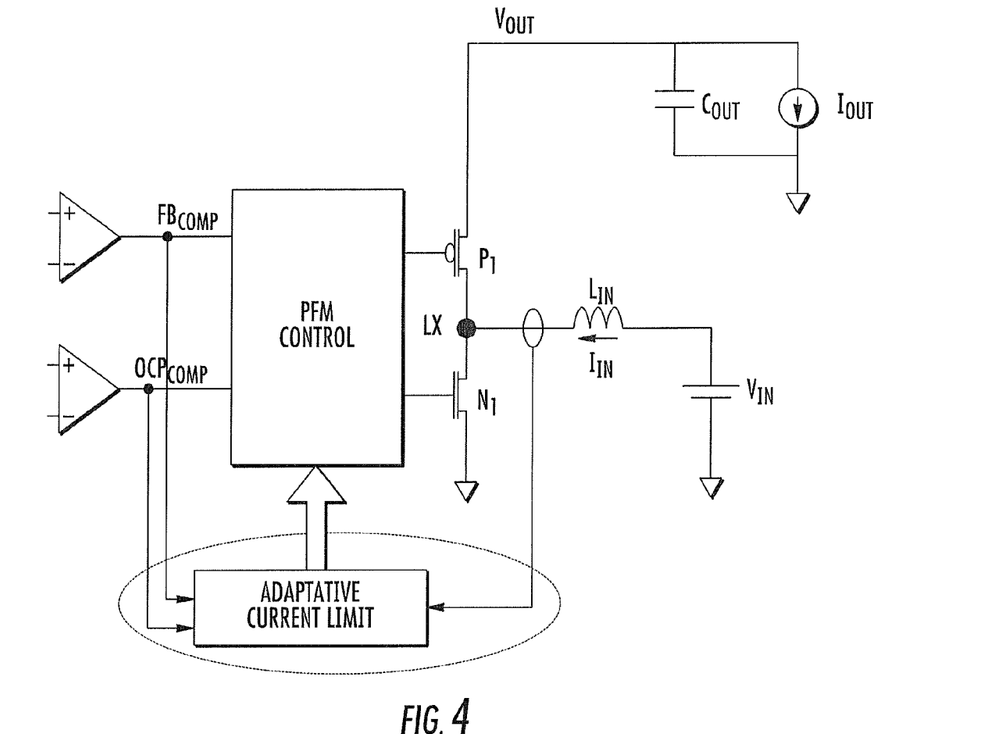
FIG. 4 is a schematic block diagram of a DC-DC step-up converter of this invention.

To achieve a low ripple and high efficiency for a large range of input voltages, output voltages, and load currents, according to an embodiment, the comparison threshold of the current through the inductor is adjusted as a function of the comparison flags $FB_{COMP}$ and $OCP_{COMP}$, as schematically illustrated in FIG. 4.

Preferably, different levels of current limitations are established up to a maximum level $I_{MAX}$. For example, it is possible to set m=4 uniformly spaced current thresholds.

Figure 5:
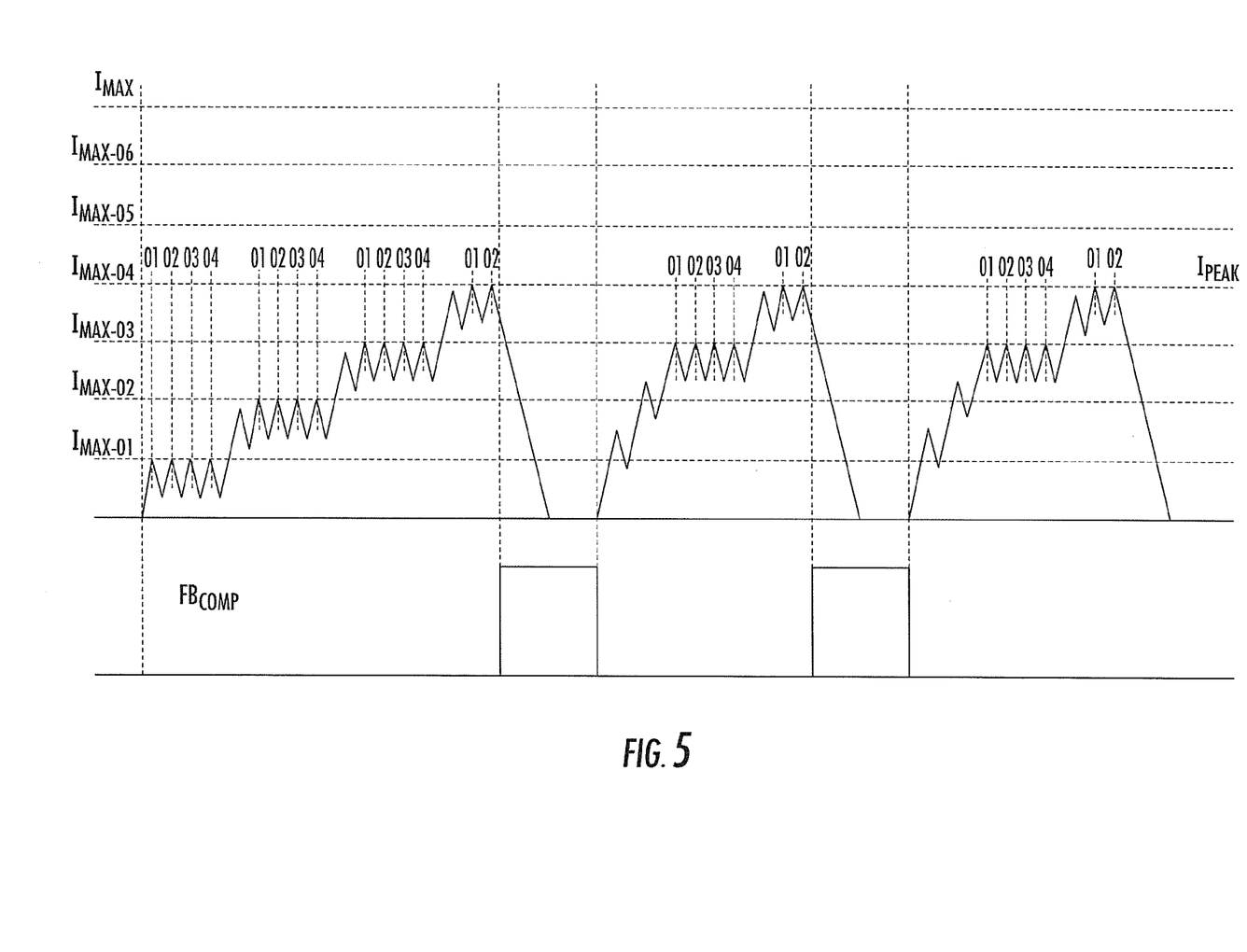
FIG. 5 illustrates sample waveforms of the current through the inductor of a DC-DC step-up controller according to the method of this invention.

As shown in FIG. 5, when $FB<FB_{REF}$, the device starts switching with the fixed duty-cycle, but with a current limitation determined by the first threshold $I_{MAX}01$. A certain number of switchings (for example n=3) is counted. If the condition $FB<FB_{REF}$ continues to be verified, the next larger current threshold $I_{MAX}02$ is chosen and so forth until $FB=FB_{REF}$. This increases the switching frequency of the device, thus achieving a higher energy transfer from the input to the output with current peaks through the inductor that remain smaller than in prior art circuits.

As soon as $FB=FB_{REF}$ the inductor is discharged on the load with a current smaller than the maximum threshold, and the last current limitation threshold setting is recorded. When again $FB<FB_{REF}$, the device will start switching again with a current limitation threshold set at the immediately smaller level than the level of the recorded last current limitation threshold.

With such a control, the device adjusts the control to the load being supplied. If the peak current through the inductor is excessively small, it is stepwise increased for ensuring a sufficient output current or stepwise decreased if too large. The advantage is that the peak current through the inductor will be adjusted to the lowest possible value compatible to load conditions. Therefore, the ripple and the switching losses tied to the mean square of the current are reduced.

Figure 6:
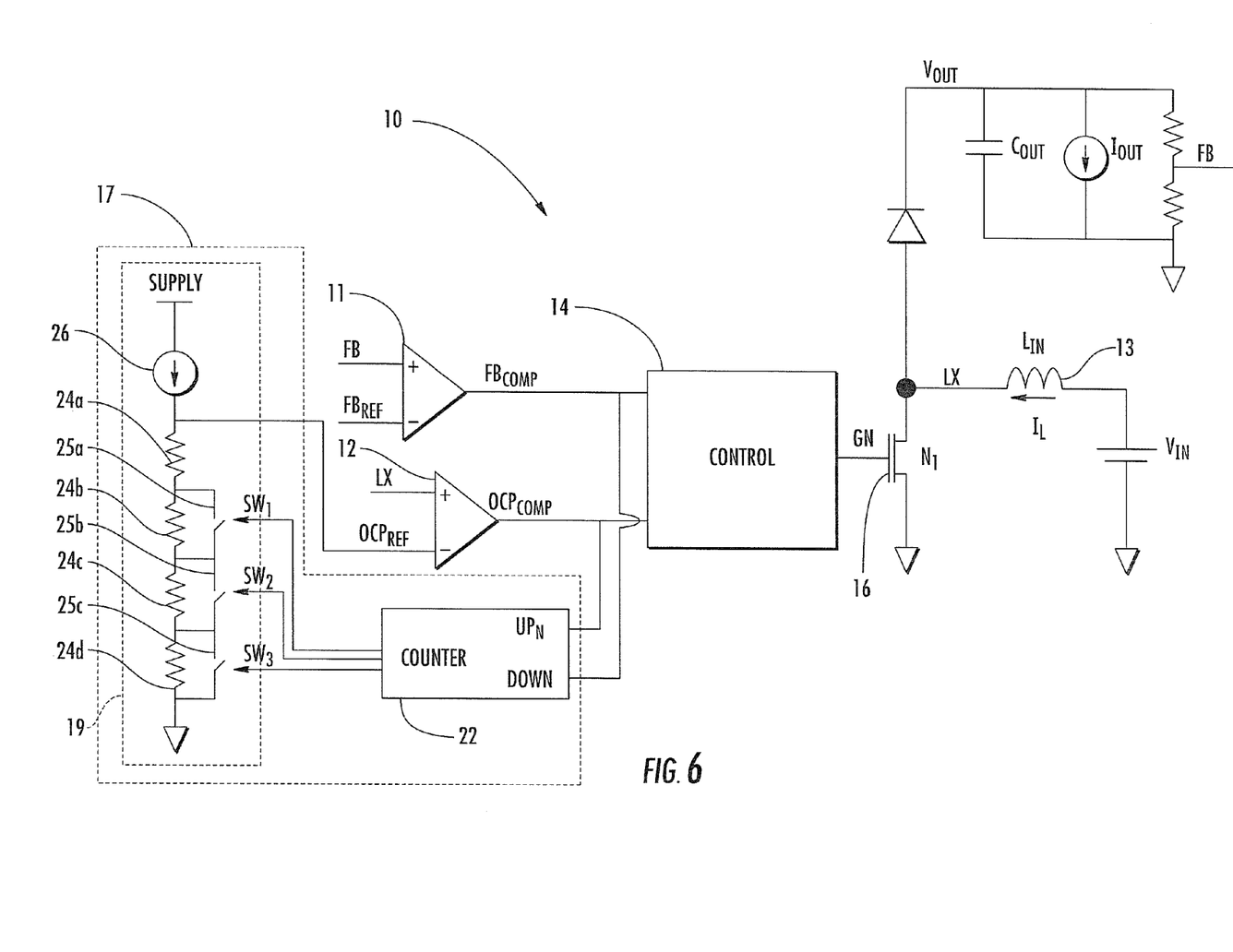
FIG. 6 illustrates a first embodiment of a controller of this invention.
Figure 7:
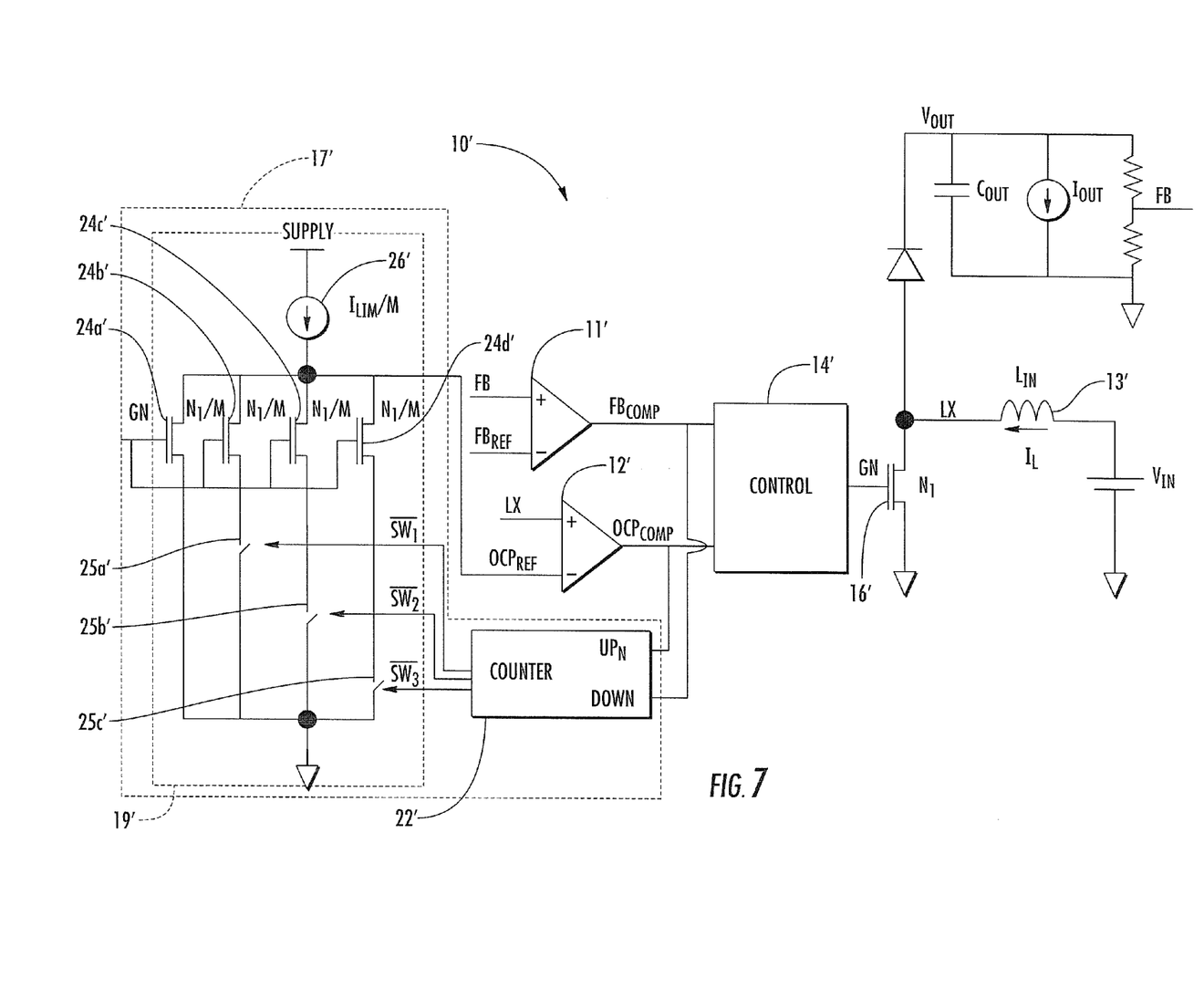
FIG. 7 illustrates a second embodiment of a controller of this invention.
Figure 8:
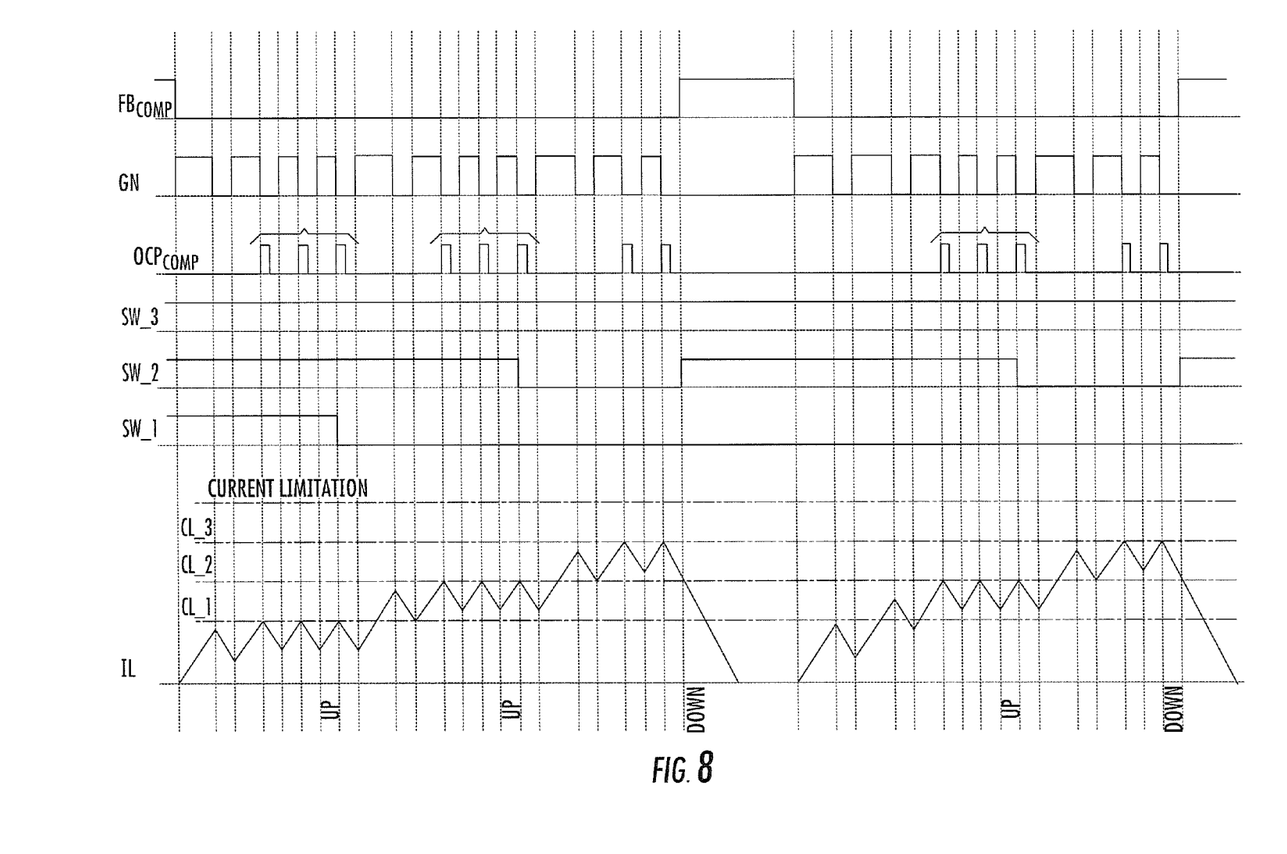
FIG. 8 illustrates waveforms of the main signal of the controllers of FIGS. 6 and 7.

Two sample embodiments of the DC-DC step-up converter are illustrated in FIGS. 6 and 7, and the graphs of the relative main signals of the converter are illustrated in FIG. 8.

Turning now to FIG. 6, a DC-DC step-up converter 10 illustratively includes a first comparator 11 to compare a signal representing a converter output voltage with a first threshold, and to generate a first comparison flag based on the converter output voltage signal comparison. The DC-DC step-up converter 10 also includes a second comparator 12 to compare a signal representing a voltage across an energy storage inductor 13 with a second threshold, and to generate a second comparison flag based on the energy storage inductor signal comparison. A power switch control circuit 14 has inputs 15 to receive the first comparison flag and second comparison flag and to control at least one power switch 16. A circuit 17 to establish the second threshold and has inputs 21 to receive the first comparison flag and second comparison flag and to adjust the second threshold as a function of the first and second comparison flags.

The circuit 17 also illustratively includes an up-down counter 22 to up-count logically active edges of the second comparison flag and to down-count logically active edges of the first comparison flag and an incrementing circuit 19 that increments the second threshold when the up-down counter counts a pre-established number of logically active edges. The incrementing circuit 19 illustratively includes a resistors 24a-24d coupled in series, and shunt switches 25a-25c coupled between the resistors. A current generator 26 is coupled to force a current through the resistors 24a-24d. A control circuit 27 closes the shunt switch when the up-down counter 22 has counted the pre-established number of active edges.

An external digital counter and additional switches may be added to the step-up converter 10 without introducing any static current dissipating circuits. This feature is important for forming converters with reduced stand-by power consumptions.

Referring additionally to FIG. 7, another embodiment of the DC-DC step-up converter 10 is illustrated. In this embodiment, the resistors 24a-24d are illustratively replaced with transistors 24a'-24d'.

The embodiments described herein may be effective for controlling the peak current through the inductor as a function of the load current, without any complex control loop and external compensation components.

That which is claimed:

1. A method of controlling a DC-DC step-up converter including at least one power switch and an energy storage inductor, comprising:
    comparing a signal representing a converter output voltage to a first threshold;
    generating a first comparison flag based on the converter output voltage comparison;
    comparing a signal representing a voltage across the energy storage inductor to a second threshold;
    generating a second comparison flag based on the energy storage inductor voltage comparison;
    controlling the at least one power switch based upon the first comparison flag and the second comparison flag; and
    stepwise adjusting the second threshold based upon the first comparison flag and the second comparison flag to limit a ripple on the converter output voltage.

2. The method of claim 1, wherein stepwise adjusting comprises:
    down-counting logically active edges of the first comparison flag;
    up-counting logically active edges of the second comparison flag;
    incrementing the second threshold by a pre-established step when the counting reaches a value; and
    resetting the counting when the counting reaches the value.

3. The method of claim 2, wherein the second threshold has a maximum value.

4. The method of claim 2, further comprising:
    storing a value of the second threshold when the first comparison flag switches to logically active;
    discharging the energy storage inductor when the first comparison flag switches to logically active;
    down-counting logically active edges of the first comparison flag;
    up-counting logically active edges of the second comparison flag;

setting the second threshold to the stored value minus one pre-established step;

incrementing the second threshold by the pre-established step when the counting equals the value; and resetting the counting when the counting reaches the value.

5. A DC-DC step-up converter comprising:

a first comparator to compare a signal representing a converter output voltage with a first threshold, and to generate a first comparison flag based on the converter output voltage signal comparison;

a second comparator to compare a signal representing voltage across an energy storage inductor with a second threshold, and to generate a second comparison flag based on the energy storage inductor signal comparison;

a power switch control circuit having inputs to receive the first comparison flag and second comparison flag and to control at least one power switch; and a circuit to establish the second threshold, the circuit having inputs to receive the first comparison flag and second comparison flag and to adjust the second threshold as a function of the first and second comparison flags.

6. The DC-DC step-up converter of claim 5, wherein said circuit is for stepwise adjusting the second threshold based upon the first comparison flag and the second comparison flag to limit a ripple on the converter output voltage.

7. The DC-DC step-up converter of claim 5, wherein said power switch control circuit inputs control the at least one power switch according to a pulse frequency modulation (PFM) technique.

8. The DC-DC step-up converter of claim 5, wherein said circuit comprises:

an up-down counter to up-count logically active edges of the second comparison flag and to down-count logically active edges of the first comparison flag;

an incrementing circuit to increment the second threshold when said up-down counter counts a pre-established number of logically active edges.

9. The DC-DC step-up converter of claim 8, wherein said incrementing circuit comprises:

a plurality of resistors coupled in series;

a shunt switch coupled to at least one of said plurality of resistors;

a current generator coupled to force a current through said plurality of resistors; and a control circuit to close said shunt switch when said up-down counter has counted the pre-established number of active edges.

10. A DC-DC step-up converter comprising:

at least one power switch;

an energy storage inductor;

a first comparator to compare a signal representing a converter output voltage with a first threshold, and to generate a first comparison flag based on the converter output voltage signal comparison;

a second comparator to compare a signal representing a voltage across said energy storage inductor with a second threshold, and to generate a second comparison flag based on the energy storage inductor signal comparison;

a power switch control circuit having inputs to receive the first comparison flag and second comparison flag and to control said at least one power switch; and a circuit to establish the second threshold, the circuit having inputs to receive the first comparison flag and second comparison flag and to adjust the second threshold as a function of the first and second comparison flags.

11. The DC-DC step-up converter of claim 10, wherein said circuit is for stepwise adjusting the second threshold based upon the first comparison flag and the second comparison flag to limit a ripple on the converter output voltage.

12. The DC-DC step-up converter of claim 10, wherein said power switch control circuit inputs control the at least one power switch according to a pulse frequency modulation (PFM) technique.

13. The DC-DC step-up converter of claim 10, wherein said circuit comprises:

an up-down counter to up-count logically active edges of the second comparison flag and to down-count logically active edges of the first comparison flag;

an incrementing circuit to increment the second threshold when said up-down counter counts a pre-established number of logically active edges.

14. The DC-DC step-up converter of claim 13, wherein said incrementing circuit comprises:

a plurality of resistors coupled in series;

a shunt switch coupled to at least one of said plurality of resistors;

a current generator coupled to force a current through said plurality of resistors; and a control circuit to close said shunt switch when said up-down counter has counted the pre-established number of active edges.

* * * * *